(12) United States Patent
Katsumata et al.

(10) Patent No.: US 10,136,113 B2
(45) Date of Patent: Nov. 20, 2018

(54) PROJECTION IMAGE DISPLAY APPARATUS FOR REDUCING UNNECESSARY LIGHT IN THE PROJECTED IMAGE

(71) Applicant: Panasonic Intellectual Property Management Co., Ltd., Osaka (JP)

(72) Inventors: Yohei Katsumata, Osaka (JP); Shouichi Yoshii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/399,978

(22) Filed: Jan. 6, 2017

(65) Prior Publication Data

US 2017/0208302 A1 Jul. 20, 2017

(30) Foreign Application Priority Data

Jan. 19, 2016 (JP) ................. 2016-007914
Dec. 12, 2016 (JP) ................. 2016-239973

(51) Int. Cl.
*H04N 9/31* (2006.01)
*G02B 26/08* (2006.01)
*G03B 21/20* (2006.01)
*G02B 27/14* (2006.01)
(Continued)

(52) U.S. Cl.
CPC ....... *H04N 9/3158* (2013.01); *G02B 26/0833* (2013.01); *G02B 27/141* (2013.01); *G03B 21/008* (2013.01); *G03B 21/14* (2013.01); *G03B 21/204* (2013.01); *H04N 9/312* (2013.01); *H04N 9/3114* (2013.01); *H04N 9/3161* (2013.01)

(58) Field of Classification Search
CPC ........ G02B 26/10; G02B 26/08; G02B 26/12; H04N 9/31
See application file for complete search history.

(56) References Cited

U.S. PATENT DOCUMENTS

2005/0237496 A1* 10/2005 Sannohe ............... G02B 5/005
353/97
2007/0035701 A1* 2/2007 Lee .................... G02B 26/0833
353/33
2015/0070741 A1* 3/2015 Bowron .................. G03B 9/02
359/223.1

FOREIGN PATENT DOCUMENTS

JP 2000-098272 4/2000

* cited by examiner

*Primary Examiner* — Sultan Chowdhury
*Assistant Examiner* — Danell L Owens
(74) *Attorney, Agent, or Firm* — McDermott Will & Emery LLP

(57) ABSTRACT

The projection image display apparatus of the disclosure includes a light source, a projection optical system that projects light entering an incident port, an optical modulator element, and wavelength selection filter. The optical modulator element includes multiple mirrors on its base. These mirrors are driven to switch, based on an image signal, between the ON state for reflecting a light entering from a light source toward the incident port of the projection optical system and the OFF state for reflecting a light entering from the light source in a direction other than the incident port of the projection optical system. In light entering from the light source to irradiate the optical modulator element, the wavelength selection filter reflects a light wavelength component that will be planar reflection light after being reflected on the base and entering the incident port of the projection lens.

3 Claims, 7 Drawing Sheets

(51) Int. Cl.
*G03B 21/00* (2006.01)
*G03B 21/14* (2006.01)

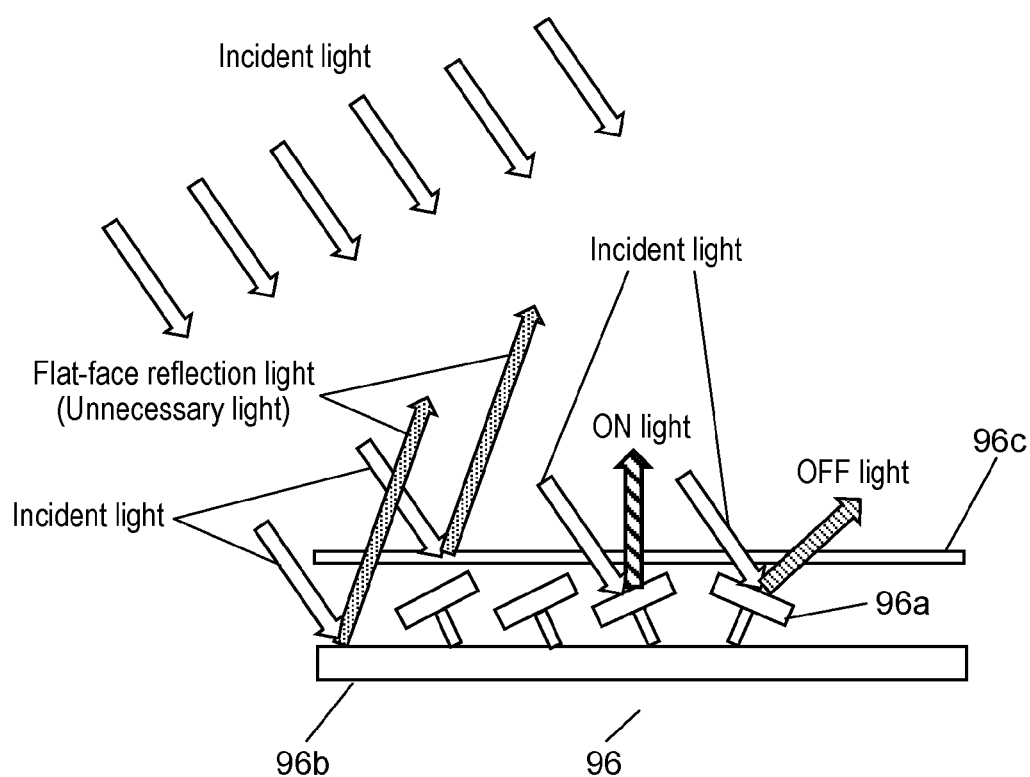

PROJECTION IMAGE DISPLAY APPARATUS FOR REDUCING UNNECESSARY LIGHT IN THE PROJECTED IMAGE

BACKGROUND

1. Technical Field

The disclosure relates to projection image display apparatuses.

2. Description of the Related Art

A single-plate projector adopting DMD (digital mirror device) selects a color of light entering DMD timewise by a rotary color wheel to display color images, as described in PTL1. This can be achieved with a relatively compact configuration. However, only one color of light from a light source can always be used, and thus a light utilization efficiency cannot be increased. Accordingly, enhanced light-collecting efficiency has been demanded.

To increase the light-collecting efficiency, the light-collecting F-number on the system side is preferably small. When DMD is used as an image display element, the OFF light is significantly out of entrance pupil of a projection lens, and thus it does not cause any problem. However, light reflected on an untilted portion other than a micromirror of DMD (e.g., light reflected on a front glass of DMD) enters at a position adjacent to the ON light. When part of this beam, scattered light, or diffracted light enters a portion where the ON light enters, i.e., an entrance pupil of the projection lens, unnecessary light invades a projected image.

In this case, a beam portion that may become the above unnecessary light is blocked typically by a metal plate. However, this will also block a portion that is originally effective as projected light, resulting in decreasing the light-collecting efficiency

CITATION LIST

Patent Literature

PTL1 Unexamined Japanese Patent Publication No. 2000-98272

SUMMARY

The disclosure offers a projection image display apparatus that achieves both shielding of unnecessary light and retention of transmittance of effective luminous flux.

The projection image display apparatus of the disclosure includes a light source, a projection optical system that projects light entering an incident port, an optical modulator element, and wavelength selection filter. The optical modulator element includes multiple mirrors on its base. These mirrors are driven to switch, based on an image signal, between the ON state for reflecting a light entering from a light source toward the incident port of the projection optical system and the OFF state for reflecting a light entering from the light source in a direction other than the incident port of the projection optical system. In light entering from the light source to irradiate the optical modulator element, the wavelength selection filter reflects a light wavelength component that will be planar reflection light after being reflected on the base and entering the incident port of the projection lens.

The projection image display apparatus of the disclosure is advantageous for reducing unnecessary light in a projected image to achieve a highly-efficient optical system.

BRIEF DESCRIPTION OF THE DRAWINGS

FIG. 3 illustrates a mechanism of generating unnecessary light in DMD.

DETAILED DESCRIPTION

Exemplary embodiments are detailed below with reference to drawings. However, details more than required may be omitted in the description. For example, details of well-known items and duplicate description of practically same structures may be omitted. This is to facilitate understanding of those skilled in the art by avoiding unnecessary lengthy description.

Attached drawings and description below are provided to help those skilled in the art sufficiently understand the disclosure. They are therefore illustrative and not restrictive of subject matters of the claims.

Exemplary Embodiment

The exemplary embodiment is described below with reference to FIG. 1 to FIG. 7C.

[1-1. Configuration]

[1-1-1. Overall Configuration]

Figure 1:
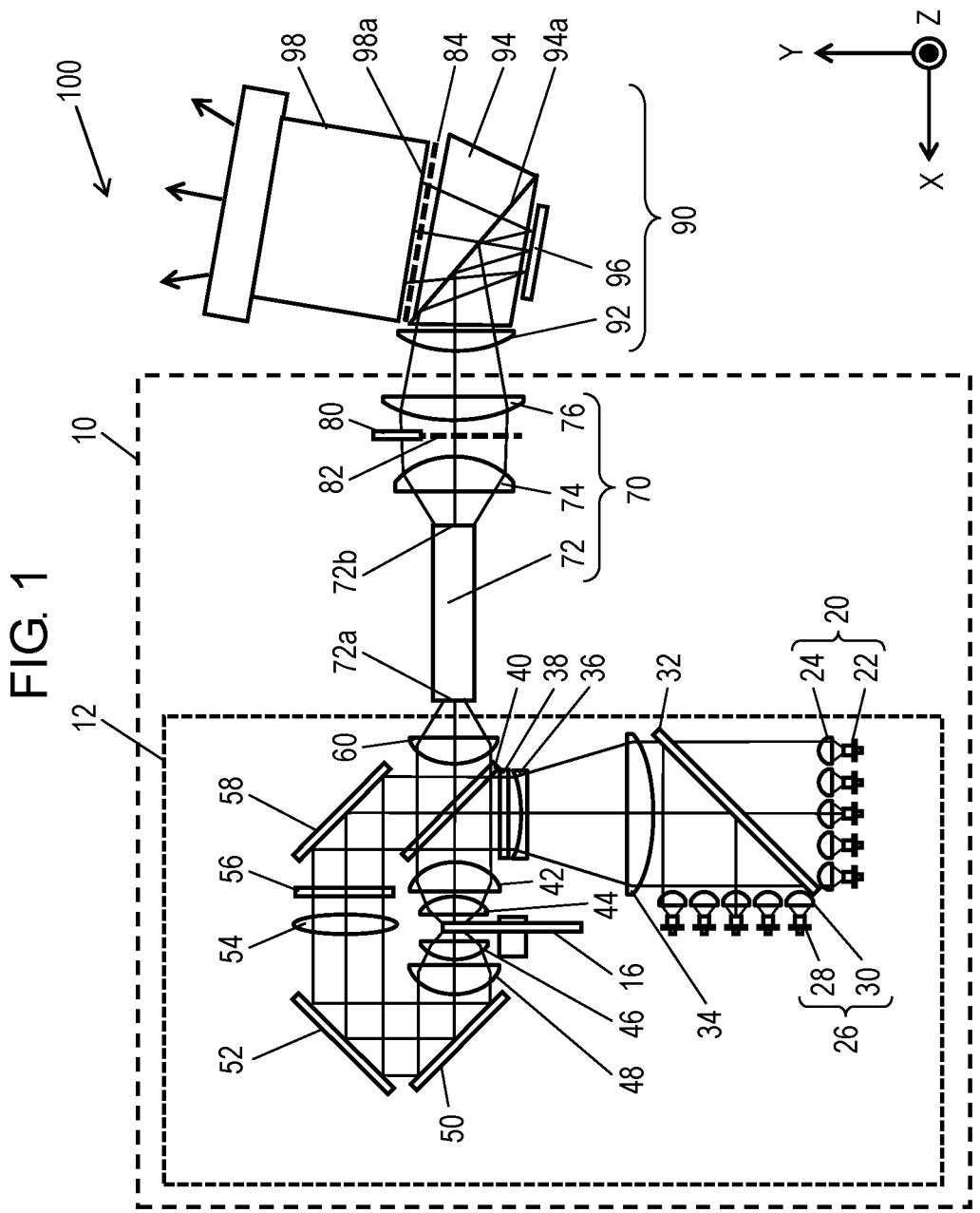
FIG. 1 is a configuration of an optical system of a projection image display apparatus in accordance with an exemplary embodiment.

FIG. 1 is an optical configuration of projection image display apparatus 100 in the exemplary embodiment. In this embodiment, projection image display apparatus 100 is a projector.

Projection image display apparatus 100 includes lighting device 10, image generator 90, and projection lens 98 that projects an image light generated by image generator 90 on a screen (not illustrated).

Lighting device 10 irradiates uniform and substantially-parallel beam to image generator 90. Lighting device 10 is detailed later.

Image generator 90 includes lens 92, total reflection prism 94, and one DMD (digital mirror device) 96. Lens 92 has a function to image light at an emitting face of rod integrator 72 on DMD 96. Light entering total reflection prism 94 via lens 92 is reflected on face 94a toward DMD 96.

DMD 96 has a controller (not illustrated) to control on and off according to a timing of each color light entering each of multiple mirrors and an input image signal, so as to modulate the image signal. More specifically, multiple mirrors are provided on a base of DMD 96, and these mirrors are driven to switch, based on the image signal, between the ON state for reflecting light entering from the light source toward the incident port of the projection lens, and the OFF state for reflecting light entering from the light source in a direction other than the incident port of the projection lens. Light modulated and emitted by DMD 96 (image light) passes through total reflection prism 94 and is guided to the incident port 98*a* of projection lens 98. In the exemplary embodiment, a DMD whose diagonal size is 0.67", for example, is used as DMD 96. DMD 96 is an example of the optical modulator element.

Projection lens 98 projects the image light entering the incident port and synthesized time-wise on a screen (not illustrated) outside the device. The F-number of projection lens 98 is, for example, 1.7. Projection lens 98 is an example of the projection optical system.

[1-1-2. Configuration of Lighting Device]

As shown in FIG. 1, lighting device 10 includes light source device 12 and light guide optical system 70 that guides light emitted from light source device 12 to image generator 90.

First laser module 20 and second laser module 26 include semiconductor laser element 22 and semiconductor laser element 28 disposed in matrix of 5×5 for outputting blue laser beam with wavelength of 450 nm, respectively, and collimating lens 24 and collimating lens 30 provided in each of the semiconductor laser elements. Collimating lens 24 and collimating lens 30 have a function to collect light with spread angle emitted from the semiconductor laser elements to collimated luminous flux. First laser module 20 and second laser module 26 are examples of the light source.

Light emitted from each of the laser modules is spatially synthesized by mirror 32. Semiconductor laser elements of the first and second laser modules are disposed at an equal interval. Positions of the laser modules are adjusted so that light emitted from first laser module 20 and light emitted from second laser module 26 enter at different positions on mirror 32. Therefore, AR (anti-reflection) coating to increase transmission of laser beam is applied to an area in mirror 32 where light emitted from first laser module 20 enters, and mirror coating to increase reflection against laser beam is applied to an area in mirror 32 where light emitted from second laser module 26 enters.

Laser beam synthesized by mirror 32 is collected and superimposed by lens 34. Light collected by lens 34 passes through lens 36 and diffusion plate 38 before entering dichroic mirror 40. Lens 36 has a function to return the light collected by lens 34 to collimated luminous flux again, and diffusion plate 38 has a function to reduce interference of laser beam and also adjust collectivity of laser beam.

Dichroic mirror 40 is a color synthesizing element whose cutoff wavelength is set to about 480 nm. Accordingly, light substantially collimated by lens 36 is reflected by dichroic mirror 40 to be irradiated to phosphor wheel 16.

Phosphor wheel 16 is controlled to rotate corresponding to a period of one frame of an image to be projected (e.g., 1/60 sec), and has multiple segments (areas) on its rotating substrate along the rotating direction (circumferential direction). Each segment area is, for example, a red fluorescent emission part, green fluorescent emission part or notched laser beam transmission part, so as to change action on laser beam timewise.

Laser beam irradiated to a fluorescent area, which is a fluorescent emission part, of phosphor wheel 16 is converted to green and red fluorescent lights at a fluorescent spot where the laser beam is irradiated, and reflected on phosphor wheel 16. These green and red fluorescent lights are collimated by lenses 44 and 42, returned to dichroic mirror 40, and passed through dichroic mirror 40.

On the other hand, mirrors 50, 52 and 58 are disposed on an optical path in order to return light passing through a notched area (i.e., blue light) to dichroic mirror 40 again. Since blue light passing phosphor wheel 16 is collected by lenses 42 and 44, lenses 46 and 48 for collimating the light, lens 54 for relaying an extended optical path, and diffusion plate 56 for further reducing laser beam interference are disposed on the optical path.

The light passing phosphor wheel 16 and returning to dichroic mirror 40, after being relayed in the optical path, is reflected on dichroic mirror 40. In this way, the optical path of light passing phosphor wheel 16 (blue light) and the optical path of reflected light (green light and red light) are spatially synthesized by dichroic mirror 40.

Light synthesized by dichroic mirror 40 is collected by lens 60, and then emitted from light source device 12.

Light emitted from light source device 12 (i.e., light from phosphor wheel 16) enters rod integrator 72. Rod integrator 72 has incident face 72*a* and emission face 72*b*. Illumination intensity of light from light source device 12 that has entered incident face 72*a* of rod integrator 72 is further unified in rod integrator 72 and emitted from emission face 72*b*. Light emitted from emission face 72*b* is relayed by lenses 74 and 76, and enters image generator 90 as light output from lighting device 10. Light-shielding member 80 for blocking unnecessary light is disposed on a position 82 conjugated with entrance pupil 84 of projection lens 98. This light-shielding member 80 is a color filter described later, and is an example of the wavelength selection filter.

[1-2. Operation]

The operation of projection image display apparatus 100 as configured above is described below. In projection image display apparatus 100, lighting device 10 outputs light of three colors: red light, green light, and blue light, switched timewise. Image generator 90 generates an image light from light entering from lighting device 10. Projection lens 98 magnifies and projects the generated image light entering incident port 98*a* on a screen. A controller (not illustrated) synchronizes and controls DMD 96 of image generator 90 and phosphor wheel 16 of lighting device 10. The controller controls DMD 96 to generate an image light corresponding to each color, based on the image signal input. This allows projection of image light of each color on the screen in a time-division manner. The user can visually recognize the image light as an image by consecutively looking at image lights projected on the screen.

In this configuration, however, a light-collecting efficiency of the screen is determined by the size of the illumination part of light source device 12 and a relationship of a spread angle of emitted light, effective area of DMD 96, and cone angle of incident light to DMD 96. Here, the size of illumination part of light source device 12 is the size of fluorescent spot for red light and green light, and is the size of secondary light source image formed on diffusion plate 38 for the blue light.

The cone angle of the incident light to DMD 96 becomes tilt angle ±α of micromirror of DMD 96. The F-number of projection lens 98 is a value that can capture light at ±α degree.

$$Fp1 = 1/(2 \times \sin(\alpha))$$

Fp1: F-number of projection lens

If this F-number is a large value that cannot capture incident light, a light quantity loss occurs. Therefore, it is preferable to reduce the light-collecting F-number on both the system side and projection lens in order to increase the light-collecting efficiency toward the projection screen on satisfying the above formula.

Figure 2:
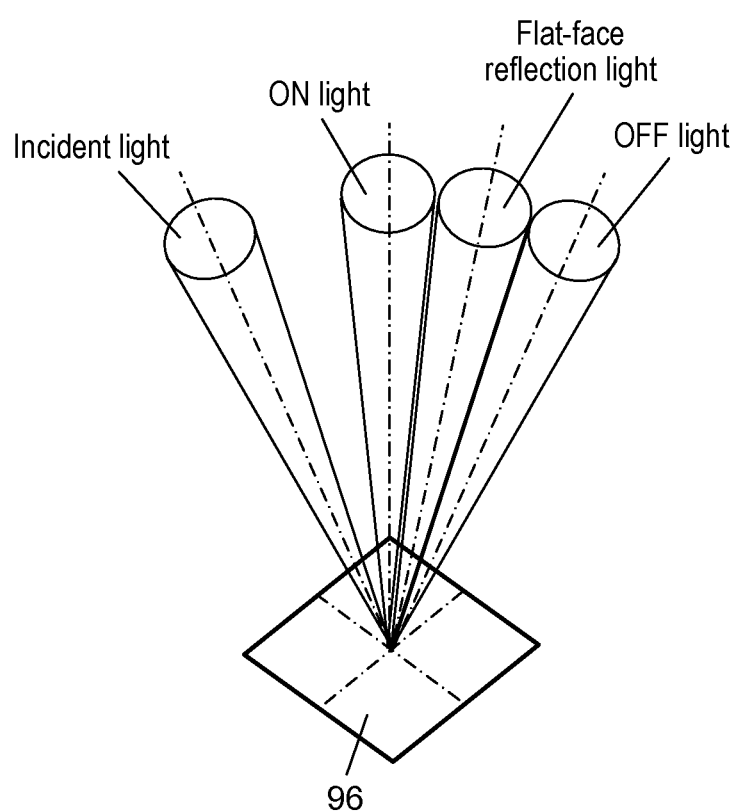
FIG. 2 illustrates a reflection state of incident light in DMD.

FIG. 2 shows the state of incident light reflected on DMD. As shown in FIG. 2, the incident light to DMD is reflected after being typically separated to ON light, planar reflection light, and OFF light.

FIG. 3 illustrates a mechanism of generating unnecessary light in DMD. As shown in FIG. 3, the ON light is a light that is reflected on micromirror 96a of DMD 96, and forms an image on entering the projection lens. The OFF light is a light that is reflected on micromirror 96a of DMD 96, but does not form an image because this light does not enter the projection lens. When DMD 96 is used as the optical modulator element, the OFF light is significantly out of entrance pupil 84 of the projection lens, as shown in FIG. 2 and FIG. 3, and thus there is no problem of affecting a projection image formed by the ON light.

However, as shown in FIG. 3, the incident light to DMD 96 is reflected also on front glass 96c and an untilted planar part provided on base 96b, other than micromirror 96a. Light reflected on front glass 96c and planar part of base 96b is collectively called flat-face reflection light or planar reflection light. In other words, the flat-face reflection light is generated on a flat part of base 96b where micromirror 96a is provided, in addition to front glass 96c of DMD 96, and is reflected as unnecessary light at a position adjacent to the ON light.

Figure 4A:
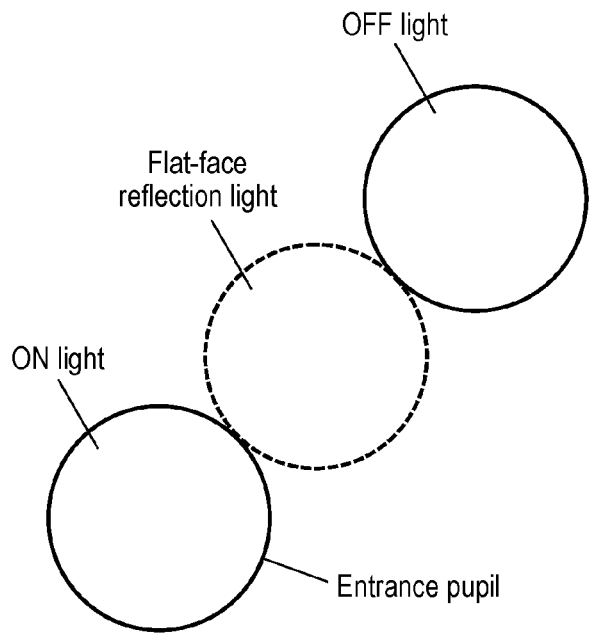
FIG. 4A and FIG. 4B illustrate a reflection state of the incident light in DMD when illumination light with large F-number is used.
Figure 4B:
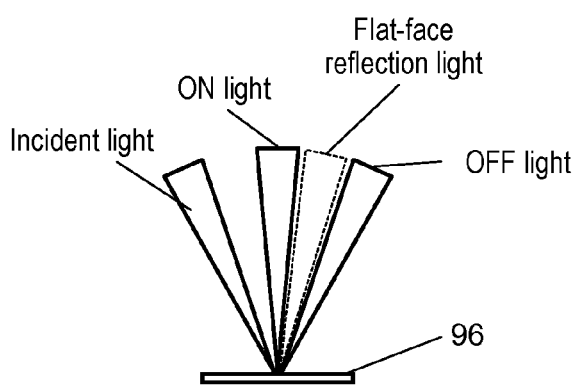
Figure 5A:
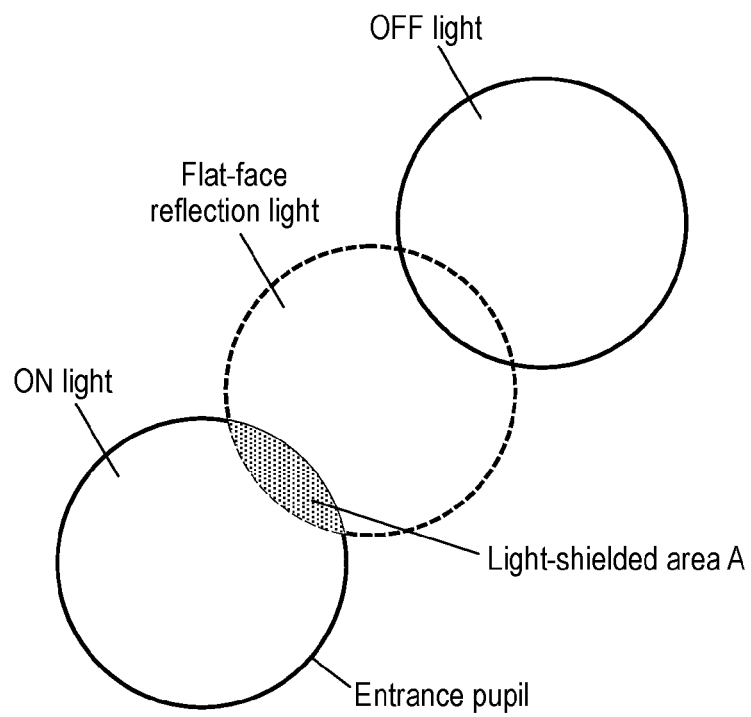
FIG. 5A and FIG. 5B illustrate a reflection state of the incident light in DMD when illumination light with small F-number is used.
Figure 5B:
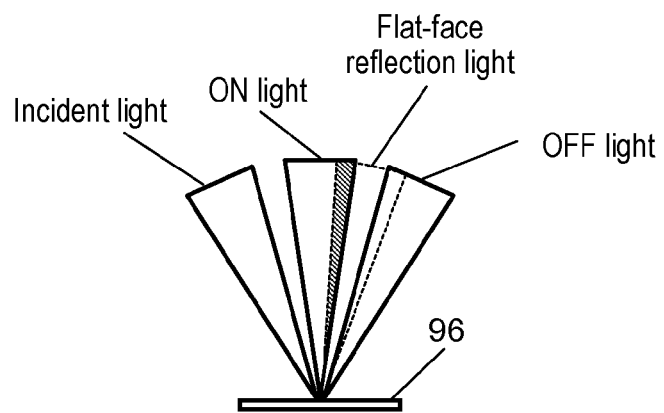

FIG. 4A illustrates the illumination state of ON light reflected on DMD, flat-face reflection light, and OFF light when illumination light with large F-number is used. FIG. 4B illustrates the state of incident light reflected on DMD in this state. FIG. 5A illustrates the illumination state of ON light reflected on DMD, flat-face reflection light, and OFF light when illumination light with small F-number is used. FIG. 5B illustrates the state of incident light reflected on DMD in this state.

When illumination light with large F-number is used, flat-face reflection light does not overlap with entrance pupil 84, as shown in FIG. 4A and FIG. 4B, and thus does not enter the projection lens. Accordingly, there is no influence on a projected image formed by the ON light. Conversely, when illumination light with small F-number is used, the flat-face reflection light includes a portion overlapped with the ON light (light-shielded area A), as shown in FIG. 5A and FIG. 5B. In this case, part of flat-face reflection light, scattered light, and diffracted light enter an incident portion of ON light, i.e., entrance pupil 84 of the projection lens. This affects a projected image.

Also in the OFF state (display in black), projection lens 98 captures flat-face reflection light and reflected light at an edge of DMD through incident port 98a, and thus unnecessary light invades the projected image. In particular, when such flat-face reflection light enters in black display, a picture quality is significantly degraded.

Therefore, when illumination light with cone angle larger than tilt angle of DMD is used and the projection lens has the F-number corresponding to this cone angle, light-shielding member 80 formed typically of a metal plate is provided in advance at entrance pupil 84 in FIG. 1 or position 82 conjugated with entrance pupil 84, in order to prevent entry of flat-face reflection light.

Figure 6:
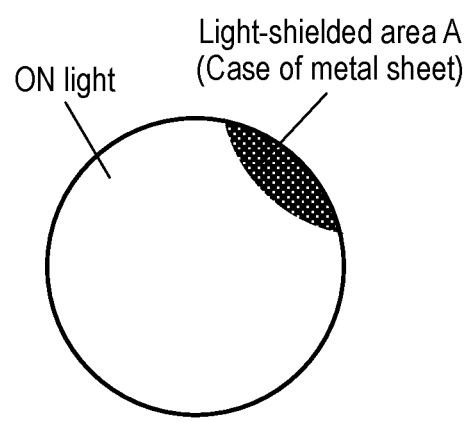
FIG. 6 illustrates an illumination state near an entrance pupil of a projection lens when a metal plate is used for shielding light.

FIG. 6 shows the illumination state near entrance pupil 84 when a metal light-shielding plate is provided as light-shielding member 80 to block the flat-face reflection light. If a portion of flat-face reflection light entering entrance pupil 84 is blocked in advance in this way, part of ON light is also blocked, and thus light utilization efficiency decreases.

Figure 7A:
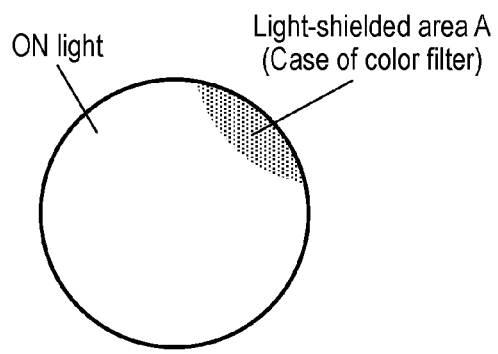
FIG. 7A illustrates an illumination state near the entrance pupil of the projection lens when a color filter is used for shielding light.
Figure 7B:
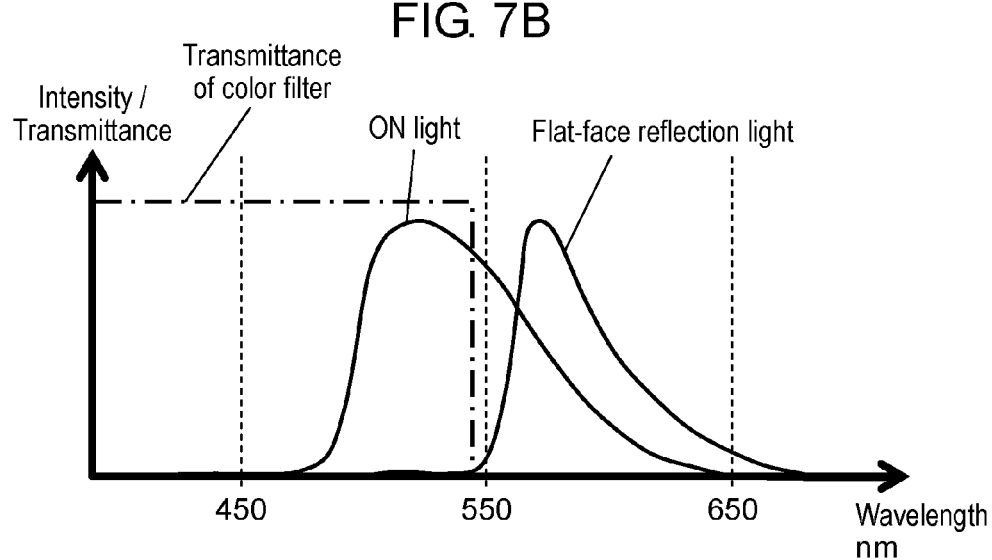
FIG. 7B illustrates spectrums of ON light reflected on DMD and flat-face reflection light, and characteristic of the color filter.

Accordingly, in the exemplary embodiment, a color filter is used as light-shielding member 80. FIG. 7A shows the illumination state of entrance pupil of projection lens filtered by light-shielding member 80 configured with the color filter. FIG. 7B shows the ON light, example of spectrum of the flat-face reflection light, and example of characteristic of the color filter. As described above, unnecessary light, such as the flat-face reflection light, is light reflected on the edge of micromirror 96a, base 96B, and front glass 96c of DMD 96, and has an optical path different from the ON light. Therefore, in principle, spectrum is different from that of the ON light. In the exemplary embodiment, for example, the flat-face reflection light has spectrum including yellow to red relative to white light of the ON light.

A dashed line in FIG. 7B shows characteristic of the color filter used as light-shielding member 80. It is apparent from the characteristic that light-shielding member 80, which is the color filter, has reduced transmittance for wavelength of flat-face reflection light. In other words, light-shielding member 80, which is the color filter, reflects a wavelength component of the flat-face reflection light. In the exemplary embodiment, as shown in FIG. 7B, the flat-face reflection light has spectrum longer than wavelength of the ON light, and thus a color filter with low transmittance for long wavelength is used as light-shielding member 80. More specifically, the color filter reduces transmittance around 540 nm to half.

Figure 7C:
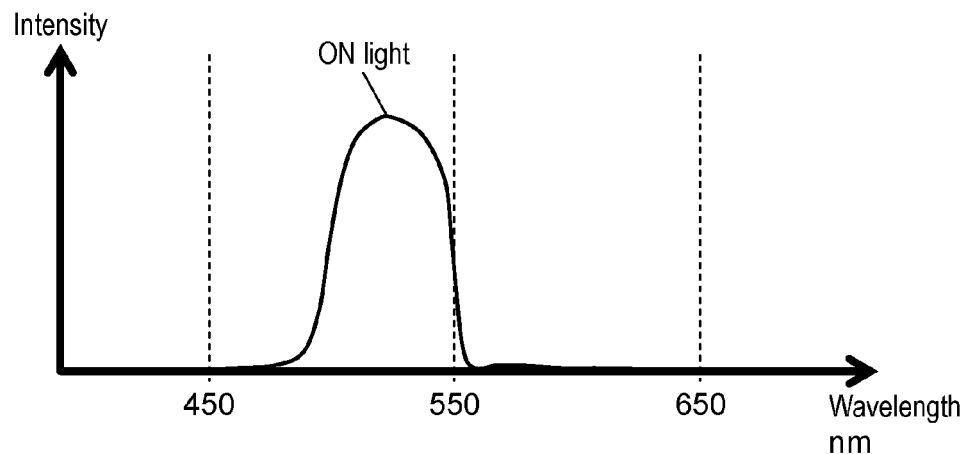
FIG. 7C illustrates spectrum of ON light in a shielded area when the color filter is used for shielding light.

As a result, spectrum in light-shielded area A of ON light in FIG. 7A is filtered by the color filter, as shown in FIG. 7C, and becomes light with significantly-reduced light intensity in long wavelength area. In other words, the color filter practically cuts the flat-face reflection light in FIG. 7B.

This color filter has transmittance of about 80%, for example, for spectrum of ON light. Since light-shielded area A accounts for about 6% of the entire area, transmittance of ON light is about 94% when a metal plate is used as light-shielding member 80. When the color filter is used as light-shielding member 80, transmittance of ON light improves to about 98.8%.

In this way, projection image display apparatus 100 increases light utilization efficiency by providing a wavelength selection filter for reflecting wavelength components of flat-face reflection light on an optical path where part of light from the light source that becomes flat-face reflection light in the incident light irradiating DMD passes, so as to suppress entry of flat-face reflection light to the projection lens.

[1-3. Effects]

As described above, the use of color filter as light-shielding member 80 in the exemplary embodiment enables to block entry of flat-face reflection light to entrance pupil 84 of the projection lens. Accordingly, utilization efficiency of ON light can be improved.

Other Exemplary Embodiments

The exemplary embodiment above is described as an example of technology disclosed in the application. However, the technology in the disclosure is applicable to other exemplary embodiments by modification substitution, addition, omission, and so on, without limitations. Still more, each component described in the above exemplary embodiment may be combined to form a new embodiment. Other exemplary embodiments are thus illustrated below.

In the above exemplary embodiment, spectrum shown in FIG. 7B is described as an example of the flat-face reflection light. However, spectroscopic characteristic of the flat-face reflection light differs by optical modulator element being used. Accordingly, transmission characteristic of the color filter is not limited to spectrum shown in FIG. 7B. For example, when the flat-face reflection light also includes light close to blue, a color filter with low transmittance for blue may also be used.

Still more, the above exemplary embodiment illustrates the laser module configured with a semiconductor laser element disposed in matrix of 5×5. However, the number of semiconductor laser elements and their layout are not limited. They may be set as appropriate according to light intensity per semiconductor laser element and output required for the light source device. Wavelength of laser beam is also not limited to 450 nm. For example, a violet semiconductor laser element outputting light of 405 nm or a semiconductor laser element outputting ultraviolet light of 400 nm or below may be used.

The above exemplary embodiment illustrates a configuration that light whose main wavelength is red and green is emitted by exciting fluorescent substance with a garnet structure activated with cerium, using a blue laser beam. However, a fluorescent substance that emits light whose main wavelength is yellow or blue green may be used.

An optimum laser beam spot diameter on fluorescent substance slightly changes, depending on the size of optical modulator element, F-number of projection optical system, type of fluorescent substance, and intensity of laser beam entering fluorescent substance. Accordingly, appropriate and optimum values can be set according to a parameter optimization method indicated in the above exemplary embodiment in accordance with specifications of each projection image display apparatus.

INDUSTRIAL APPLICABILITY

The disclosure is applicable to projection image display apparatuses employing a reflective optical modulator element, such as DMD.

What is claimed is:

1. A projection image display apparatus comprising:
a lighting device including alight source;
a projection optical system that is configured to project light entering an incident port of the projection optical system;
an optical modulator element in which a plurality of mirrors are provided on a base of the optical modulator element, the mirrors being driven to switch, based on an image signal, between:
an on state for reflecting ON light entering from the lighting device, toward the incident port of the projection optical system, and
an off state for reflecting OFF light entering from the lighting device, in a direction other than a direction of the incident port of the projection optical system; and
a wavelength selection filter that is configured to reflect a wavelength component of a flat-face reflection light reflected on the base and entering the incident port of the projection optical system in the light entering from the lighting device to irradiate the optical modulator element,
wherein the wavelength selection filter is disposed at a position in the lighting device so as to be conjugated with an entrance pupil of the projection optical system, and
wherein the wavelength selection filter prevents transmittance of the flat-face reflection light and allows transmittance of the ON light, the flat-face reflection light having a higher wavelength than the ON light.

2. The projection image display apparatus according to claim 1, wherein the wavelength selection filter prevents transmittance of higher wavelength light than red light.

3. The projection image display apparatus according to claim 1, wherein the wavelength selection filter prevents transmittance of higher wavelength light than yellow light.

* * * * *